(12) United States Patent
Kumar et al.

(10) Patent No.: US 8,589,723 B2
(45) Date of Patent: Nov. 19, 2013

(54) METHOD AND APPARATUS TO PROVIDE A HIGH AVAILABILITY SOLID STATE DRIVE

(75) Inventors: Panakaj Kumar, Chandler, AZ (US); James Mitchell, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 12/975,944

(22) Filed: Dec. 22, 2010

(65) Prior Publication Data

US 2012/0166699 A1     Jun. 28, 2012

(51) Int. Cl.
    *G06F 11/00*     (2006.01)
(52) U.S. Cl.
    USPC ............................................. 714/4.5; 714/6.3
(58) Field of Classification Search
    USPC .................... 714/4.5, 6.21, 6.3, 11
    See application file for complete search history.

(56) References Cited

U.S. PATENT DOCUMENTS

| | | | |
|---|---|---|---|
| 6,732,289 B1 * | 5/2004 | Talagala et al. | 714/6.3 |
| 7,111,084 B2 * | 9/2006 | Tan et al. | 710/15 |
| 7,293,196 B2 * | 11/2007 | Hicken et al. | 714/11 |
| 7,328,369 B2 * | 2/2008 | Manoni | 714/11 |
| 7,519,854 B2 * | 4/2009 | Lucas et al. | 714/5.11 |
| 7,681,089 B2 * | 3/2010 | Ashmore | 714/57 |
| 7,818,525 B1 * | 10/2010 | Frost et al. | 711/165 |
| 7,861,113 B2 * | 12/2010 | Wang | 714/11 |
| 8,321,722 B2 * | 11/2012 | Tanaka et al. | 714/6.3 |
| 2005/0102557 A1 * | 5/2005 | Davies et al. | 714/11 |
| 2006/0179163 A1 * | 8/2006 | Muramatsu et al. | 710/1 |
| 2008/0201616 A1 * | 8/2008 | Ashmore | 714/57 |
| 2009/0207518 A1 | 8/2009 | Tsai et al. | |
| 2009/0274162 A1 * | 11/2009 | Gopal Gowda et al. | 370/419 |
| 2009/0327803 A1 | 12/2009 | Fukutomi et al. | |
| 2010/0083040 A1 * | 4/2010 | Voigt et al. | 714/7 |
| 2010/0115329 A1 * | 5/2010 | Tanaka et al. | 714/5 |
| 2010/0251014 A1 * | 9/2010 | Yagi | 714/9 |
| 2010/0257301 A1 * | 10/2010 | Kloeppner et al. | 710/313 |
| 2010/0274965 A1 | 10/2010 | Cleveland et al. | |
| 2011/0231369 A1 * | 9/2011 | Kawamura et al. | 707/659 |
| 2012/0210163 A1 * | 8/2012 | Cho | 714/6.21 |
| 2012/0278652 A1 * | 11/2012 | Dawkins et al. | 714/6.21 |

OTHER PUBLICATIONS

International Search Report & Written Opinion received in PCT Application No. PCT/US2011/064510, mailed Jul. 30, 2012, 6 pages.

* cited by examiner

*Primary Examiner* — Marc Duncan
(74) *Attorney, Agent, or Firm* — Caroline M. Fleming

(57) ABSTRACT

A method and apparatus to use Solid State Drives (SSD) in a high availability enterprise system is provided. Concurrent redundant paths are provided to the SSD to at least two storage controllers via a serial system bus using a non-storage bus protocol.

18 Claims, 9 Drawing Sheets

700

| DESCRIPTOR CONTROL 702 | TRANSFER SIZE 704 |
|---|---|
| SOURCE ADDRESS 706 ||
| DESTINATION ADDRESS 708 ||
| NEXT DESCRIPTOR ADDRESS 710 ||
| DESTINATION ADDRESS 2 712 ||
| DESTINATION ADDRESS 3 714 ||
| DESTINATION ADDRESS 4 716 ||
| DESTINATION ADDRESS 5 718 ||

FIG. 7

METHOD AND APPARATUS TO PROVIDE A HIGH AVAILABILITY SOLID STATE DRIVE

FIELD

This disclosure relates to the use of Solid State Drives (SSD) and in particular to the use of SSDs in high availability storage systems.

BACKGROUND

A high availability system tolerates a single point failure by providing fully redundant Input/Output paths and redundant storage controllers to allow access to storage devices on a redundant path when a failure is detected in a primary path to the storage devices in the system.

Typically, serial storage protocols such as Fibre Channel, Serial Attached Small Computer Systems Interface (SAS) and Serial Advanced Technology Attachment (SATA) are used by storage controllers in high availability systems to manage transfer of data between the storage devices and the storage controllers.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 7 illustrates a DMA with Multicasting Operation Descriptor format for use by the DMA controller shown in FIG. 6;

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Typically, storage devices used in a high availability system are hard disk drives (HDD) in which data is stored on a rotating media, for example, a magnetic disk drive, Compact Disk Read Only Memory (CD-ROM) drive or Digital Video Disk (DVD) drive. Typically, these disk drives include a serial storage protocol interface. Redundancy is supported by providing access to each of a plurality of storage controllers in the system to all of the storage devices accessible via the single serial storage protocol interface.

A Solid State Drive (SSD) uses NAND flash technology for block storage and thus has better I/O performance than a disk drive with rotating media. NAND is a non-volatile memory that enables sequential access to memory cells. An SSD typically includes a Peripheral Component Interconnect Express (PCIe) interface for transferring data between the SSD and a storage controller in the system over point-to-point serial links.

A PCIe link is a collection of two PCIe ports and their interconnecting PCIe lanes. A PCIe port is logically an interface between a component and a PCI Express Link and physically a group of transmitters and receivers located on the same chip that define a PCIe link. A PCIe lane is a set of differential signal pairs, one pair for transmission and one pair for reception.

In an embodiment of the present invention, a method and apparatus is provided to provide a redundant path to a PCIe SSD. A redundant path and a redundant storage controller keep data stored on the PCIe SSD accessible in the event of a single point failure.

Figure 1:
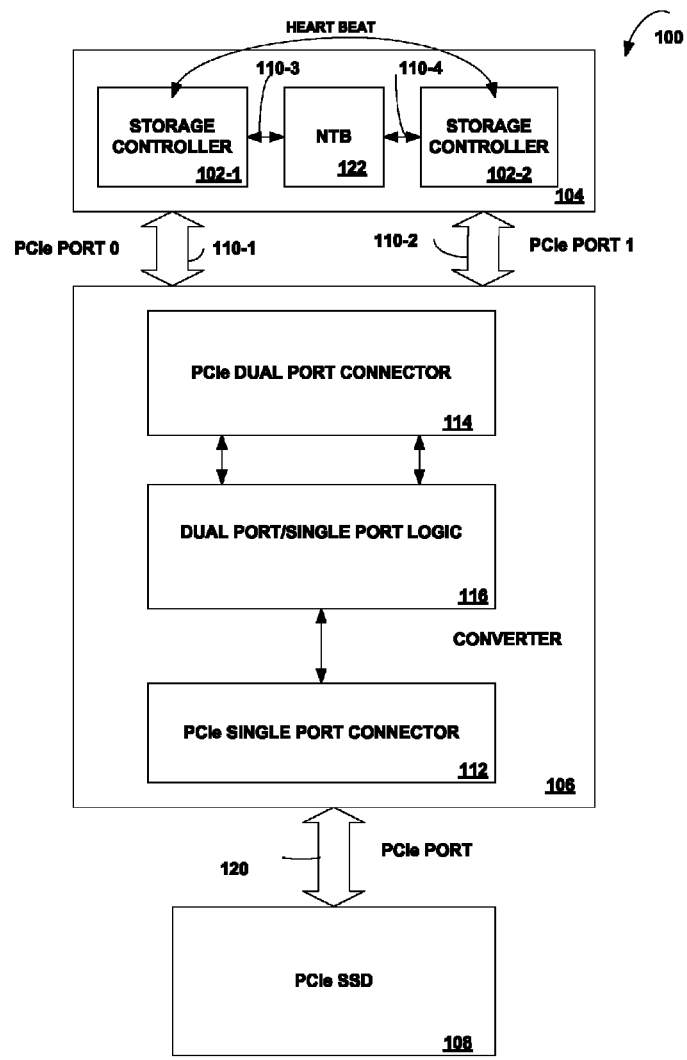
FIG. 1 is a block diagram of an embodiment of an apparatus to provide a redundant Peripheral Component Interconnect Express (PCIe) path to a PCIe Solid State Drive (SSD)

FIG. 1 is a block diagram of an embodiment of an apparatus to provide a redundant PCIe path to a PCIe SSD according to the principles of the present invention. Referring to FIG. 1, a storage subsystem 104 includes at least two storage controllers 102-1, 102-2, with each respective storage controller 102-1, 102-2 including at least one PCIe port. In other embodiments, there can be more than two PCIe ports allowing more than two storage controllers 102-1, 102-2 to share access to the PCIe SSD 108. In other embodiments, the storage controllers 102-1, 102-2 and converter 106 may communicate using other system bus protocols.

The storage controller 102-1, 102-2 in the storage system 104 may also be referred to as a "canister" or "storage blade". Each storage controller 102-1, 102-2 has a respective dedicated PCIe port 110-1, 110-2 for reading/writing data from/to a PCIe SSD. Both storage controllers 102-1, 102-2 are concurrently active. When one of the storage controllers 102-1, 102-1 fails, the other storage controller 102-1, 102-2 handles all I/O operations to the PCIe SSD 108 to the PCIe SSD 108 until the failed storage controller is operational again. A converter 106 coupled between the storage system 104 and the PCIe SSD 108 provides redundant paths to the PCIe SSD to allow both storage controllers to concurrently access the PCIe SSD 108.

The converter 106 includes a dual port PCIe connector 114, having a first PCIe port connector 110-1 coupled to storage controller 102-1 in the storage subsystem 104 and a second PCIe port connector 110-2 coupled to storage controller 102-2 in the storage subsystem 104. The converter 106 also includes a single port PCIe connector 112 coupled to the single PCIe port 120 in the PCIe SSD 108. Dual port/Single Port logic 116 in the converter 106 handles data transfer between the single port PCIe SSD 108 and the storage subsystem 104.

The dual port/single port logic 116 includes logic to support PCIe PHY layer and protocol functions for each port. In addition, the dual port/single port logic 116 includes IO virtualization logic that includes two physical functions (PF) to allow each storage controller 102-1, 102-2 to access the resources of the SSD 108. In an embodiment, the IO virtualization logic includes support for functions defined by the PCI SIG Multi-Root IO Virtualization (MR IOV) specification. The dual port/single port logic 116 will be described later in conjunction with FIG. 4.

In the embodiment shown, the converter 106 is a printed circuit board that includes the PCIe dual port connector 114 allowing the converter 106 to be inserted into a connector of a backplane (also a printed circuit board) of the system 100. In an embodiment, the system 100 includes a PCIe SSD 108.

In another embodiment, the storage controllers 102-1, 102-2 include a connector allowing them to be inserted into a connector on one side of a mid-plane (printed circuit board) and the PCIe SSD includes a drive connector (with PCIe signal and power) allowing it to be inserted into other side of the mid-plane. The mid-plane includes drive connectors with PCIe signal and power pins.

The two storage controllers (canisters) 102-1, 102-2 are connected via a PCIe Non Transparent Bridge (NTB) link 120. An NTB link 120 includes two PCIe endpoints connected back-to-back allowing the base address registers of each endpoint to create inter-domain windows, that is, a window into the address space at the other endpoint. An NTB address domain is accessible by both storage controllers 102-1, 102-2. The NTB link 120 allows memory in each of the storage controllers 102-1, 102-2 to be mirrored between the two storage controllers 102-1, 102-2. The NTB is typically used to allow failover between the two storage controllers 102-1, 102-2 in the storage subsystem 104.

In an embodiment, both storage controllers 102-1, 102-2 are operational and can concurrently access (read/write) the PCIe SSD 108. Each respective storage controller 102-1, 102-2 sends a respective periodic heart beat message to the other storage controller 102-1, 102-2 through the NTB 120.

In an embodiment a doorbell mechanism in the NTB 120 is used to send the periodic heart beat message. For example, to send a heart beat message to storage controller 102-2, storage controller 102-1 writes a bit (sets a bit) in a primary side doorbell register in the NTB 120. The write to the primary side doorbell register results in the NTB generating an interrupt for storage controller 102-2 and then hardware clears the associated bit in the primary side doorbell. The detection of the interrupt by storage controller 102-2 informs storage controller 102-2 that storage controller 102-1 has not failed (that is, storage controller 102-2 is alive/active). To send a heart beat message to storage controller 102-1, storage controller 102-2 writes a bit in the secondary side doorbell register which results in generating an interrupt for storage controller 102-1.

In addition to sending heart beat messages through the NTB 120, each respective storage controller 102-1, 102-2 monitors the link status of its respective PCIe ports 110-1, 110-3 or 110-2, 110-4 on a periodic basis. For example, in an embodiment, monitoring of link status can be performed by checking the status of a data link layer link active bit in a PCIe Link Status Register associated with the PCIe ports 110-1, 110-2, 110-3 and 110-4. In an embodiment, a link down indication status is dependent on the state of bit 13 (Data Link Layer Link Active bit) in the PCIe Link Status Register.

If either of the storage controllers 102-1, 102-2 detects a loss of the heartbeat message and/or a link down indication status, a failover procedure is started on that storage controller and an error message is flagged to indicate service is required for the failed storage controller.

Figure 2:
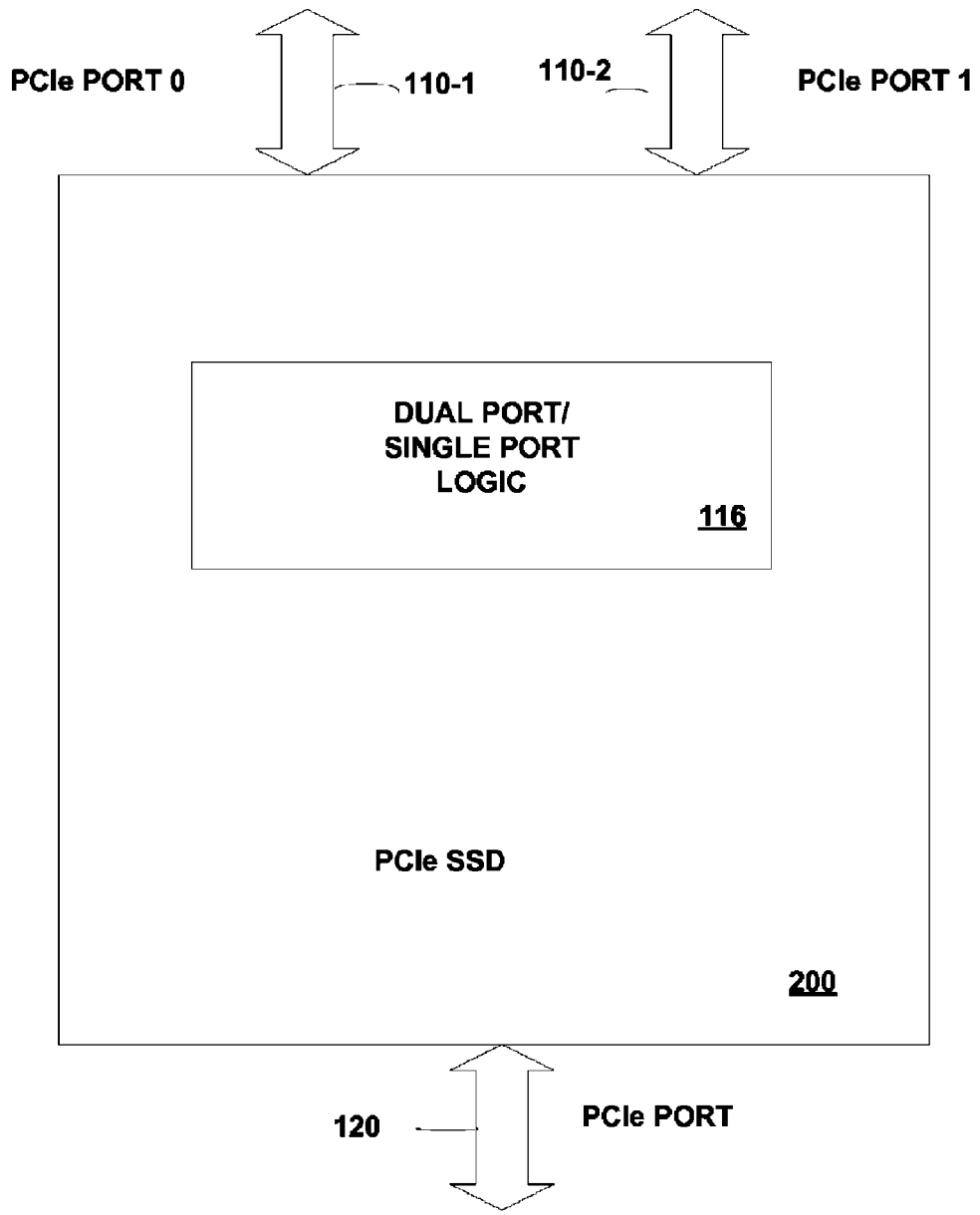
FIG. 2 is a block diagram of an embodiment of an apparatus shown in FIG. 1 integrated in a PCIe SSD to provide fully redundant PCIe paths to the PCIe SSD.

FIG. 2 is a block diagram of an embodiment of the dual port/single port logic 116 shown in FIG. 1 integrated in a dual port PCIe SSD 200 to provide fully redundant PCIe paths in the dual port PCIe SSD 200. Instead of a separate converter 106 coupled between the storage subsystem 104 and the single port PCIe SSD 108 as discussed in conjunction with FIG. 1, the dual port/single port logic 116 described in conjunction with FIG. 1 is integrated in a PCIe SSD together with a dual port PCIe interface. In an embodiment the dual port/single port logic 116 includes a software-transparent multi-processor fabric that supports sharing of I/O devices among multiple root complexes as defined by the PCI SIG Multi-Root IO Virtualization (MR IOV) specification.

In another embodiment, each storage controller 102-1, 102-2 is coupled to a single-port PCIe SSD. The PCIe SSD has a single physical function (SR-IOV). The control and data path routing and switching is performed by the PCIe SSD.

Figure 3:
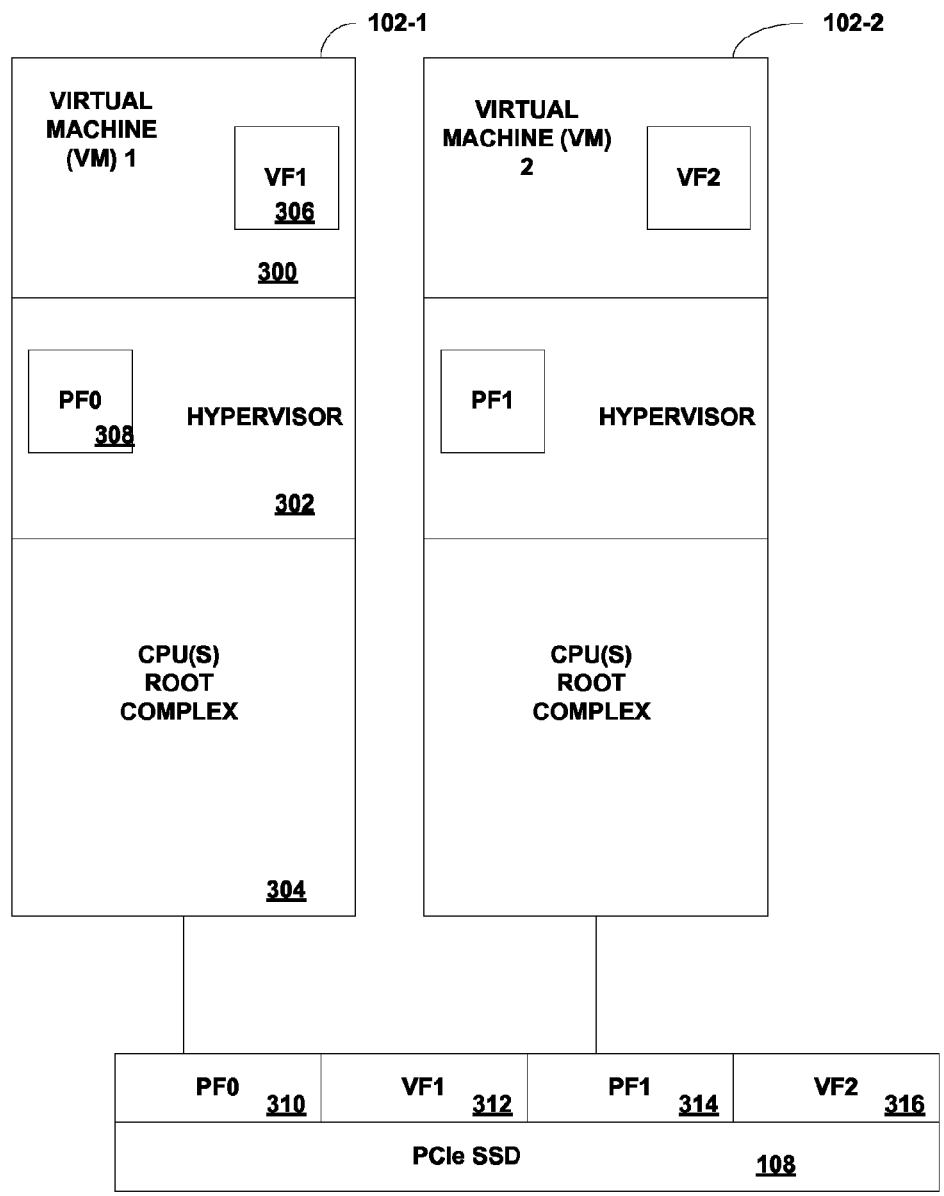
FIG. 3 is a block diagram illustrating an embodiment of an implementation of functions used in the embodiments shown in FIG. 1 and FIG. 2 to access the PCIe SSD.

FIG. 3 is a block diagram illustrating an embodiment of an implementation of functions used in the embodiments shown in FIG. 1 and FIG. 2 to access the PCIe SSD 108.

Referring to FIG. 3, each storage controller 102-1, 102-2 includes a virtual machine, a hypervisor including a physical function and a CPU root complex. Each respective CPU root complex communicates with a physical function in the PCIe SSD.

Both storage controllers 102-1, 102-2 have a dedicated path to the PCIe SSD because the PCIe Multi-Root-Input-Output-Virtual (MR-IOV) device supports a physical function for each port. The physical function 0 (PF0) is allocated to port 0 and Physical Function 1 (PF1) is allocated to port 0. Within each physical function (PF0, PF1), there are many virtual functions to support IO virtualization. The two physical functions and virtual functions allow each storage controller to read/write the data from/to the PCIe SSD.

As shown and discussed in conjunction with FIGS. 1-3, PCIe MR-IOV is used in the dual port/single port logic 116 in the converter 106 to connect the single PCIe SSD 108 to the storage subsystem 104. This allows the same single port PCIe SSD 108 to be used in servers without failover support and also in enterprise storage platforms that include support failover to a redundant storage controller in the event of a failure in the active storage controller.

As shown in FIG. 3, the PCIe multi-root 10 virtualization (MR-IOV) device is integrated into the PCIe SSD 108 to provide a dual-ported PCIe SSD 108 for use in a high availability system. The PCIe SSD 108 is accessible from two hosts using MR-IOV. A version of the MR-IOV protocol is described in Multi-Root-I/O-Virtualization and Sharing Specification Revision 1.0 published May 12, 2008 by the PCI-SIG®.

As shown in FIG. 1, the converter 106 includes three PCIe ports 110-1, 110-2, 120. Each PCIe port includes a PCIe PHY and protocol functions connected through internal fabric (IO fabric) that implement the IO virtualization feature (physical function (PF)) and virtual function (VF). Each storage controller 102-1, 102-2 is allocated a respective physical function (PF0 310, PF1 314) and the converter 106 tracks requests from each physical function 310, 314.

Figure 4:
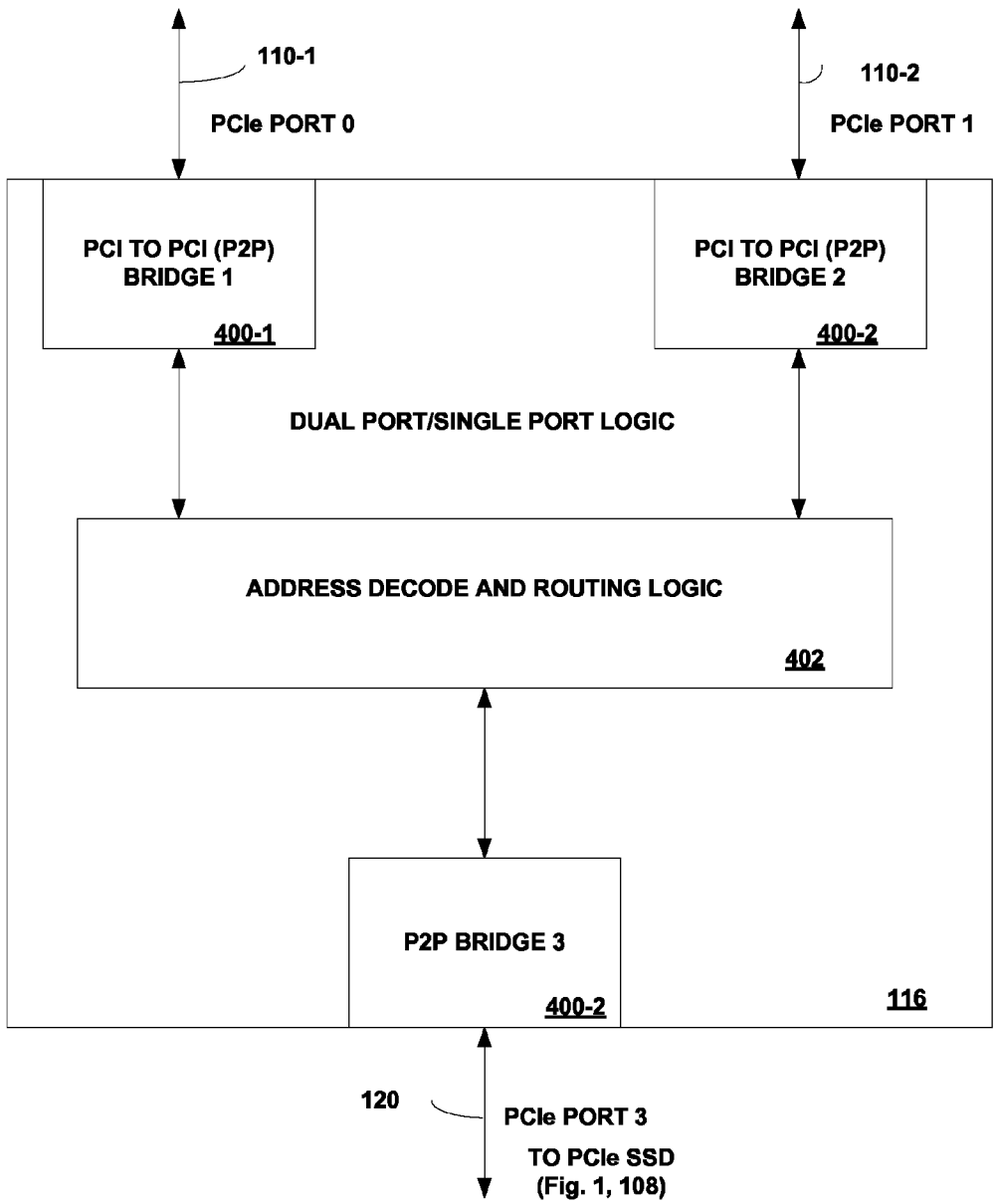
FIG. 4 is a block diagram of an embodiment of the dual port/single port logic shown in FIG. 1 and FIG. 2 to allow sharing of a PCIe SSD by a plurality of storage controllers.

FIG. 4 is a block diagram of an embodiment of the dual port/single port logic 116 shown in FIG. 1 and FIG. 2 to allow sharing of a PCIe SSD by a plurality of storage controllers by providing fully redundant PCIe paths to the PCIe SSD.

The dual port/single port logic 116 includes three PCI-to-PCI (P2P) bridges 400-1, 400-1, 400-2 coupled to address decode and routing logic 402. The address decode and routing logic 402 allows routing of packets/messages/commands received from the two upstream PCIe ports 102-1, 102-2 to the single downstream PCIe port 120. Whenever a properly formatted transaction is presented to either of the two upstream ports (Type 0 configuration transaction with Bus N+1, Device 0, Function 0, or a read/write request within the memory window of the downstream port) the transaction is forwarded to the downstream port via the address decode and routing logic 402. The routing allows each storage controller coupled to the upstream PCIe ports a path to discover the same downstream PCIe endpoint in order to allow the two storage controllers concurrent access to the PCIe SSD 108 at the downstream PCIe endpoint.

In an embodiment, each of the storage controllers 102-1, 102-2 can be included in a different host computer system. During initialization of each respective host computer system, a discovery process is initiated by each of the host computer systems to discover devices that are accessible via PCIe ports 110-1, 110-2.

PCIe configuration transactions are used during the discovery process to access configuration registers of functions within devices. A PCI Express Endpoint represented by a Type O Configuration Space header is mapped into Configuration Space as a single Function in a Device. Each PCI Express Link originates from a logical PCI-to-PCI Bridge and is mapped into Configuration Space as the secondary bus of this Bridge. The Root Port is a PCI-to-PCI Bridge structure that originates a PCI Express Link from a PCI Express Root Complex. PCI-to-PCI Bridges 400-1, 400-2 are upstream ports. PCI-to-PCI Bridge 400-3 represents a downstream port.

During the discovery process PCI-to-PCI bridge 400-1 is discovered as a result of sending PCIe configuration transactions to PCIe port 102-1. Two types (Type 0 and Type 1) of configuration transactions can be used. Type 0 configuration transactions are used to select a device on the bus on which the configuration transaction is being run. Type 1 transactions are used to pass a configuration transaction request to another bus segment.

For example, Type 1 configuration transactions are sent via PCIe port 1110-1 to a secondary PCIe bus of a PCIe Root Port physically attached to PCI-to-PCI Bridge 400-1. The PCIe Root Port is part of the host root complex and is essentially a PCIe Bridge to an external platform. The PCIe Root Port converts the Type 1 configuration transaction into a Type 0 configuration transaction and sends the Type 0 configuration transaction to PCI-to-PCI Bridge 400-1.

Having discovered the PCI-to-PCI bridge 400-1, the PCI header stored in configuration memory space in the PCI-to-PCI bridge 400-1 is read to determine devices that are accessible via the PCI-to-PCI bridge 400-1. Upon detecting from the PCI header associated with PCI-to-PCI bridge 400-1 returned in response to the Type 0 configuration transaction that the attached link partner on PCIe port 0 110-1 is a PCI-PCI Bridge, additional Type 1 configuration transactions are sent to the PCI-PCI Bridge's secondary bus to determine what is connected to the downstream port of the PCI-to-PCI Bridge 400-1.

Upon detecting Type 1 configuration transactions targeting the secondary bus of the PCI-to-PCI Bridge 400-1, PCI-to-PCI Bridge 400-1 converts the Type 1 configuration transactions to Type 0 configuration transactions and forwards the Type 0 configuration transactions to the address decode and translation logic 402. The address decode and translation logic 402 forwards the Type 0 transactions to PCI-to-PCI Bridge 400-3. Upon detecting from the PCI header read in response to the Type 0 transaction that the attached link partner on that port is also PCI-PCI Bridge, additional Type 1 configuration transactions are sent to the secondary side of PCI-to-PCI Bridge 400-3 to determine what is connected to the downstream port of PCI-to-PCI Bridge 400-3. These Type 1 configuration transactions are forwarded through PCI-to-PCI Bridge 400-1 and address decode and translation logic 402 as Type 1 configuration transactions until they reach PCI-to-PCI Bridge 400-3.

Upon reaching PCI-to-PCI Bridge 400-3, the Type 1 configuration transactions are converted to Type 0 configuration transactions. Upon detecting from reading the PCI header of the PCIe endpoint coupled through PCIe port 3 120 to PCI-to-PCI Bridge 400-3, that the endpoint device is a PCIe SSD 108, the PCIe SSD's memory space requirements can be determined. The memory space required by the PCIe SSD 108 is determined upon reading the PCI Base Address Register (BAR) space. The determined PCIe SSD memory space is mapped to a system memory map accessible by storage controller 102-1.

The discovery process described above for storage controller 102-1 is repeated for storage controller 102-2 and the determined PCIe SSD memory space is mapped to a system memory map accessible by storage controller 102-2.

After the PCIe SSD has been discovered via both storage controllers 102-1, 102-2, based on the PCI tree discovery process, both hosts share the PCIe SSD 108 and can both access configuration memory space in the PCIe SSD. Accesses to configuration memory space in the PCIe SSD are synchronized between the host computer systems such that any modifications to the configuration space in the PCIe SSD via the storage controllers are communicated to the other host prior to being made.

Both hosts share the configuration memory space in the PCIe SSD. However, each host is given exclusive access to a respective half of the memory space in the PCIe SSD 108. During normal operation each host owns half of the PCIe SSD address space and has exclusive access to its respective half. In addition, each half of the memory space is a mirror image of the other (that is, stores the same data). Upon detecting a failure of one of hosts, the non-failed host is given access to the failed host's memory space in the PCIe SSD.

Figure 5:
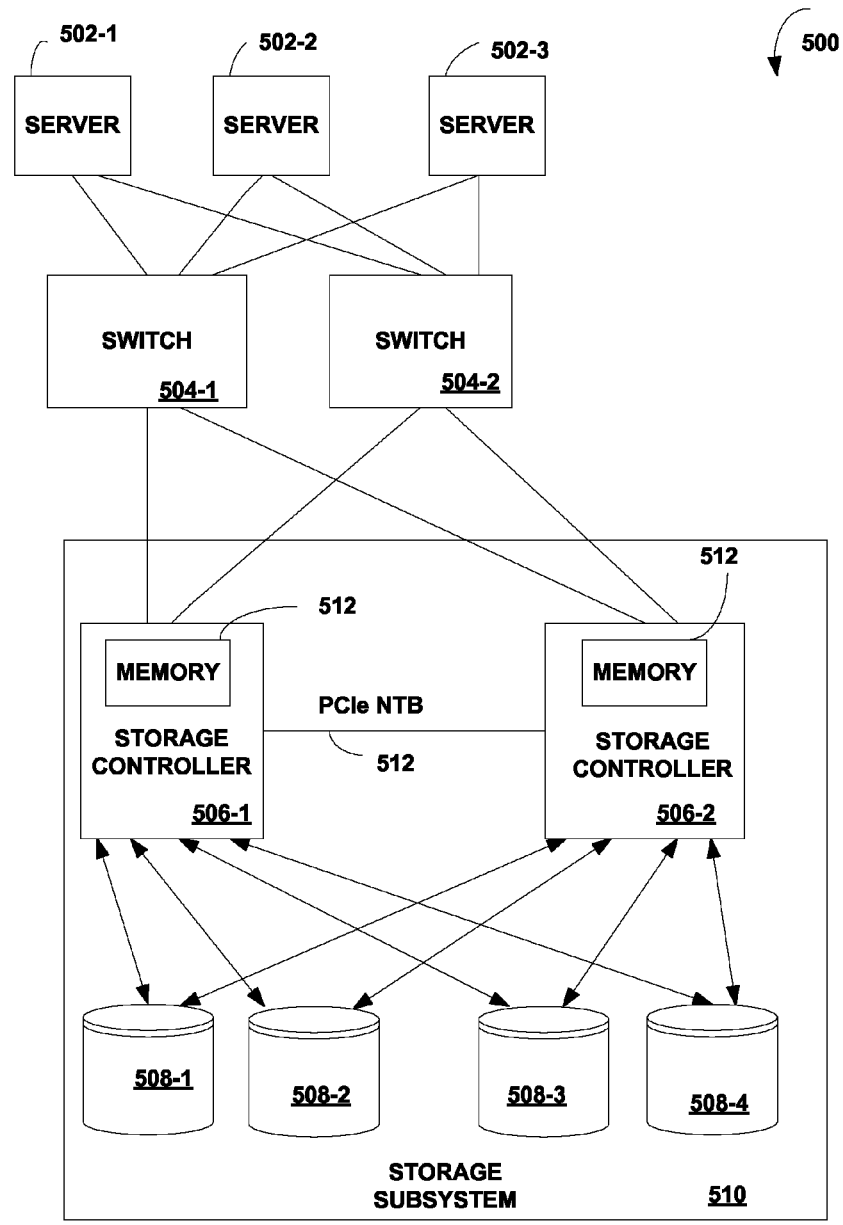
FIG. 5 is a block diagram of an embodiment of a storage subsystem in an enterprise system.

FIG. 5 is a block diagram of an embodiment of a storage subsystem 510 in an enterprise system 500. The enterprise system 500 includes a plurality of servers 502-1, 502-2, 502-3 coupled to a plurality of switches 504-1, 5042. The pluralities of switches 504-1, 504-2 are coupled to a storage subsystem 510. The storage subsystem 510 includes two storage controllers (canisters) 506-1, 506-2 connected via a PCIe Non Transparent Bridge (NTB) link 512. The storage subsystem 510 also includes a plurality of storage devices 508-1, 508-2, 508-3, 508-4.

An NTB includes two PCIe endpoints connected back-to-back allowing the base address registers of each endpoint to create inter-domain windows, that is, a window into the address space at the other endpoint. An NTB address domain is accessible by both storage controllers 506-1, 506-2. The NTB link 512 allows memory 512 in each of the storage controllers 506-1, 506-2 to be mirrored between the two storage controllers 506-1, 506-2. The NTB is typically used to allow failover between the two storage controllers 506-1, 506-2 in the storage subsystem 510.

Figure 6:
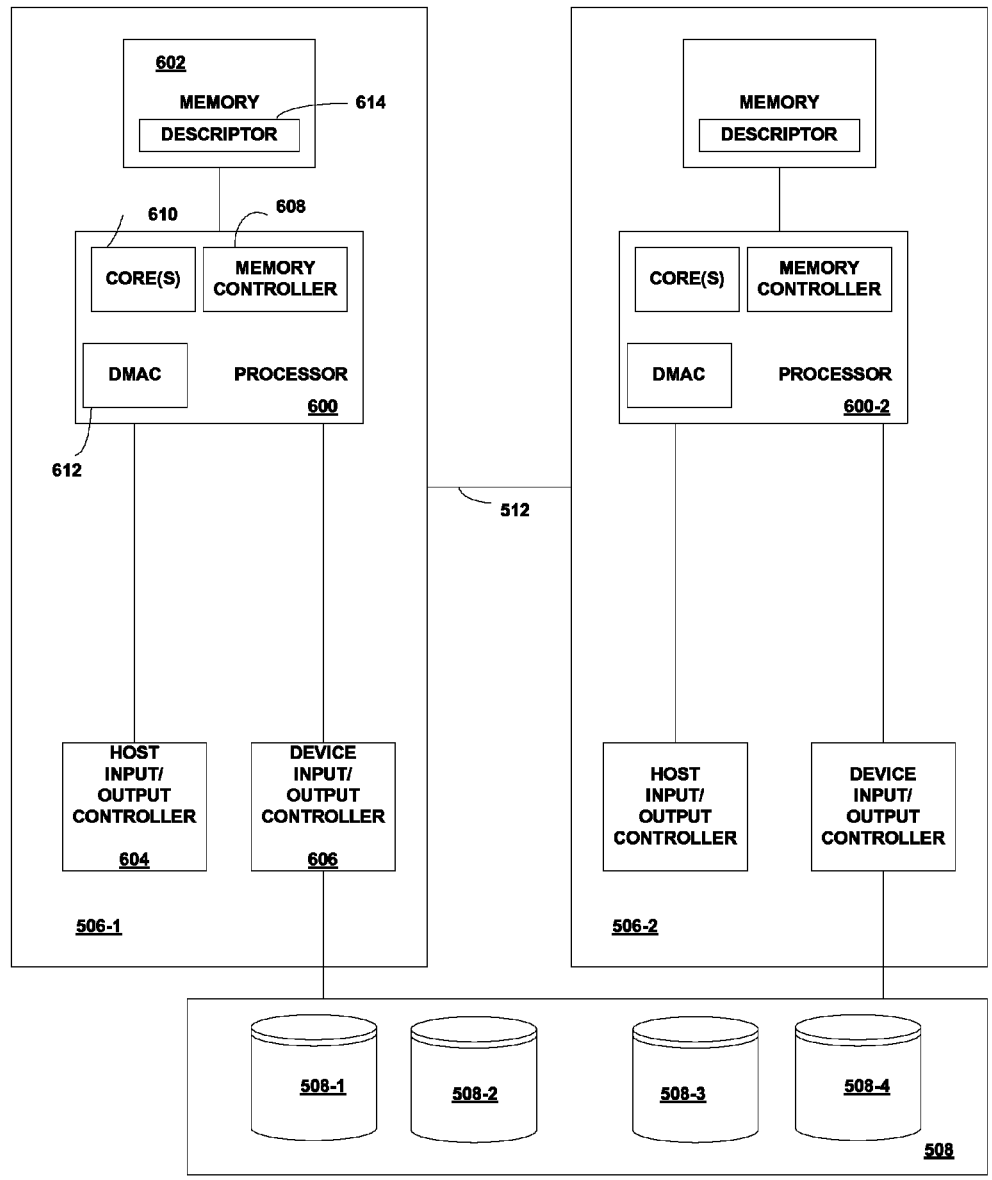
FIG. 6 is a block diagram of an embodiment of the storage subsystem shown in FIG. 5.

FIG. 6 is a block diagram of an embodiment of the storage subsystem 510 shown in FIG. 5. Each storage controller 506-1, 506-2 in the storage subsystem 510 includes a host Input/Output (I/O) controller 604, a device Input/Output (I/O) controller 606, a processor 600 and memory 602.

The memory 602 may be Dynamic Random Access Memory (DRAM), Static Random Access Memory (SRAM), Synchronized Dynamic Random Access Memory (SDRAM), Double Data Rate (DDR) RAM, Rambus Dynamic Random Access Memory (RDRAM) or any other type of memory.

The processor 600 includes a memory controller 608, one or more processor cores 610 and the Direct Memory Access (DMA) controller (DMAC) 612. In an embodiment the processor 600 is a System-On-a-Chip (SOC). The device I/O controller 606 provides access to storage devices 508-1, 508-2, 508-3, 508-4 accessible via the device IOC 606. In an embodiment, the devices 508-1, 508-2, 508-3, 508-4 can be configured as a Random Array of Independent Disks (RAID) system. For example, in an embodiment, the storage devices 508-1, 508-2, 508-3, 508-4 can be configured as a RAID 6 or RAID 5 system.

In an embodiment, the DMA controller 612 includes a plurality of DMA channels. The operation of each DMA channel is independent from the other DMA channels, which allows for different operations to be processed concurrently by each respective DMA channel.

The operations of a DMA channel include memory-to-memory data transfers and memory-to-memory mapped I/O (MMIO) data transfers. Each DMA channel moves data on command of its controlling process (the DMA client). A descriptor 614 stored in memory 602 describes a data transfer and enables the DMA controller 612 to perform the data transfer. The descriptor 614 is a data structure stored in memory 602 that stores variables that define the DMA data transfer. Upon completion of the data transfer, the DMA controller 612 can notify the processor core 610 of the completion via either an interrupt to the processor core 610, a memory write to a programmed location, or both.

In an embodiment, to initiate a DMA operation, a chain (linked list) of descriptors can be generated and stored in system memory 602. The address of the first descriptor in the chain is provided to the DMA controller 612. In an embodiment, the address of the first descriptor in the chain is written to a descriptor chain address register in the DMA controller 612. The operation is initiated for a DMA channel in the DMA controller 612, for example, via a write to a DMA channel command register in the DMA controller 612.

The host I/O controller 604 provides connectivity to any one of the servers shown in FIG. 5. The device I/O controller 606 provides access to any of the storage devices 508-1, 508-2, 508-3, 508-4 which can be a PCIe SSD used for higher performance storage.

The storage subsystem 510 shown in FIG. 6 includes a redundant storage controller ("canisters") 506-2, redundant I/O paths, redundant power supply (not shown), cooling solution (not shown) and an array of storage devices 508-1, 508-2, 508-3, 508-4. The storage devices 508-1, 508-2, 508-3, 508-4 can be disk drives, solid state devices (SSDs) or any other block-oriented non-volatile storage device. The storage subsystem 510 can tolerate a single point failure with fully redundant I/O paths and redundant storage controller configuration to keep data accessible.

All outstanding I/O transaction data to be written to a storage device 508-1, 508-2, 508-3, 508-4 by the primary storage controller 506-1 is mirrored in the memory 602 in the redundant storage controller 506-2 via the NTB 512. The NTB address domain is accessible by both storage controllers 506-1, 506-2. The mirroring operation primarily includes syncing the memory 602 of each of the two storage controllers 506-1, 506-2. This memory 602 stores data that has recently been written to one of the plurality of storage devices 508-1, 508-2, 508-3, 508-4 and data to be written to one of the plurality of storage devices 508-1, 508-2, 508-3, 508-4. While a single storage controller failure may result in loss of the contents of its local memory 602, a copy of the contents of the memory of the failed storage controller is available because it is also stored in the memory in the redundant storage controller.

When the primary (active) storage controller fails, the redundant storage controller becomes the active storage controller and obtains access to the storage device(s) 508-1, 508-2, 508-3, 508-4 of the failed primary storage device. The active storage controller performs the I/O to the storage device(s) until the failed primary storage controller is back on-line.

The host IO controller 604 provides connectivity to the server(s) 502-1, 502-2, 502-3 and the device IOC 606 provides connectivity to storage devices 508-1, 508-2, 508-3, 508-4. In an embodiment, storage devices 508-1, 508-2, 508-3, 508-4 accessible via the device IOC 606 may be configured as a Redundant Array of Independent Disks (RAID).

A RAID combines a plurality of physical storage devices (for example, hard disk drives or solid state drives) into a logical storage device for purposes of reliability, capacity, or performance. Thus, instead of multiple physical storage devices, an operating system sees the single logical drive. As is known to those skilled in the art, there are many standard methods referred to as RAID levels for distributing data across the physical storage devices in a RAID system.

For example, in a level 0 RAID system the data is striped across a physical array of storage devices by breaking the data into blocks and writing each block to a separate storage device. Input/Output (I/O) performance is improved by spreading the load across many separate storage devices. Although a level 0 RAID improves I/O performance, it does not provide redundancy because if one storage device fails, all of the data is lost A level 5 RAID system provides a high level of redundancy by striping both data and parity information across at least three separate storage devices. Data striping is combined with distributed parity to provide a recovery path in case of failure. A level 6 RAID system provides an even higher level of redundancy than a level 5 RAID system by allowing recovery from double disk failures.

In a level 6 RAID system, two syndromes referred to as the P syndrome and the Q syndrome are generated for the data and stored on hard disk drives in the RAID system. The P syndrome is generated by simply computing parity information for the data in a stripe (data blocks (strips), P syndrome block and Q syndrome block). The generation of the Q syndrome requires Galois Field (GF) multiplications and is complex in the event of a disk drive failure. The regeneration scheme to recover data and/or P syndrome block and/or Q syndrome block performed during disk recovery operations requires both GF and inverse operations.

The generation and recovery of the P and Q syndrome blocks for RAID 6 and parity for RAID 5 requires the movement of large blocks of data between system memory and a storage device (disk drive). Typically, computer systems include Direct Memory Access (DMA) controllers (engines) to perform transfers of data between memory and I/O devices. A DMA controller allows a computer system to access memory independently of the processor (core). The processor initiates a transfer of data from a source (memory or I/O device (controller)) to a destination (memory or I/O device (controller)) by issuing a data transfer request to the DMA controller. The DMA controller performs the transfer while the processor performs other tasks. The DMA controller notifies the processor, for example, through an interrupt when the transfer is complete. Typically, a DMA controller manages a plurality of independent DMA channels, each of which can concurrently perform one or more data transfers between a source and a destination.

Typically, a data transfer from a source to a destination is specified through the use of a descriptor, that is, a data structure stored in memory that stores variables that define the DMA data transfer. For example, the variables can include a source address (where the data to be transferred is stored in the source (memory (or I/O device)); size (how much data to transfer) and a destination address (where the transferred data is to be stored in the destination (memory (or I/O device)). The use of descriptors instead of having the processor write the variables directly to registers in the DMA controller prior to each DMA data transfer operation allows chaining of multiple DMA requests using a chain of descriptors. The chain of descriptors allows the DMA controller to automatically set up and start another DMA data transfer defined by a next descriptor in the chain of descriptors after the current DMA data transfer is complete.

FIG. 7 illustrates a DMA with Multicasting Operation Descriptor format for use by the DMA controller shown in FIG. 6.

Referring to FIG. 7, the DMA with Multicasting Operation Descriptor 700 includes a descriptor control field 702, a transfer size field 704 (to store the size of the data to be transferred), a source address field 706 (to store the source address for data stored in system memory) and destination address fields 706, 708, 712, 714, 716, 718 (to store the destination addresses for data stored in system memory). The DMA with Multicasting Operation Descriptor 700 also includes a next descriptor address 710 to store an address of the next descriptor in a chain of descriptors.

The DMA with multicasting operation descriptor provides an extension to the standard DMA operation in that it allows multiple simultaneous destination copy operations to be handled in one descriptor. This operation handles different destination addresses. The DMA with multicasting operation descriptor transfers the source data to multiple destinations. The number of destination address fields is encoded through a 3-bit field (Number of Destinations (DEST)) in the descriptor control field.

In an embodiment, the three bit field is encoded as shown in Table 1 below:

TABLE 1

| |
|---|
| 000: DMA copy to destination Address 1 |
| 001: DMA copy to destination Addresses 1, 2 |
| 010: DMA copy to destination Addresses 1, 2, & 3 |
| 011: DMA copy to destination Addresses 1, 2, 3, & 4 |
| 100: DMA copy to destination Addresses 1, 2, 3, 4, & 5 |

Figure 8:
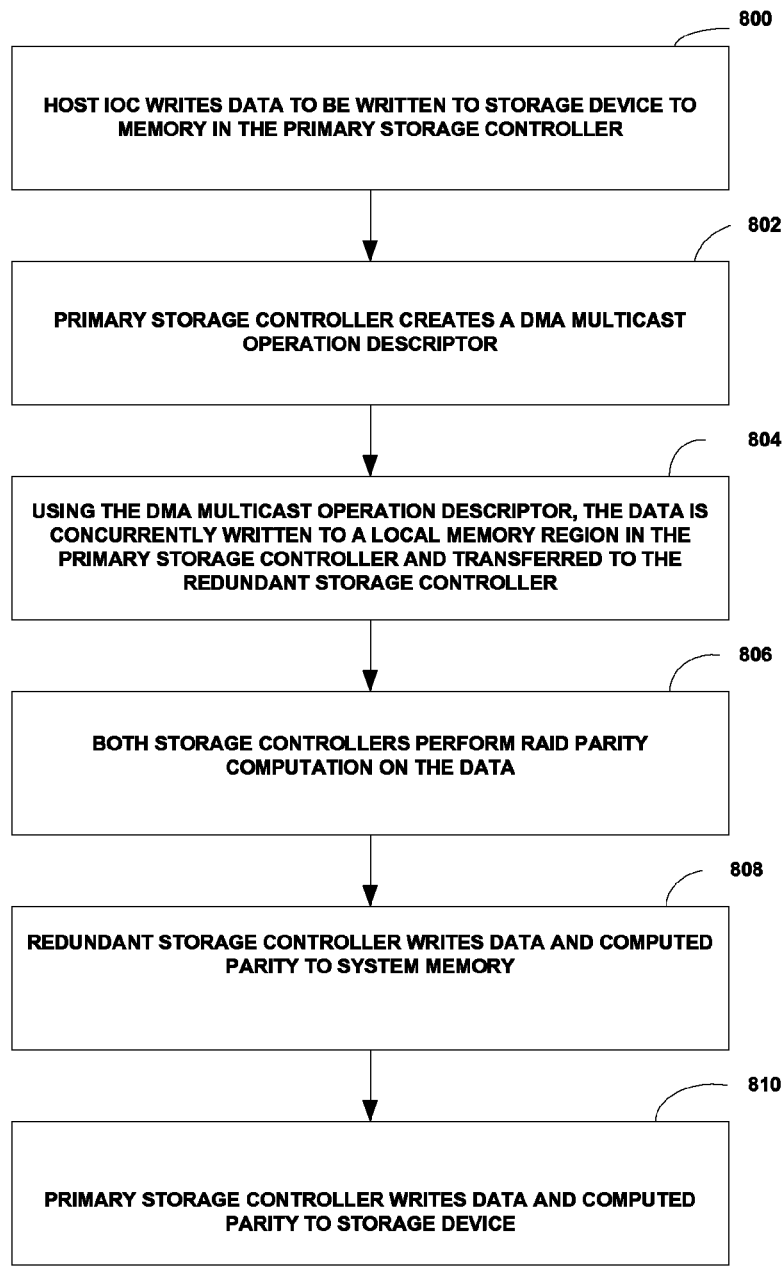
FIG. 8 is a flowgraph illustrating a RAID level 5/6 streaming mirror write operation performed in the storage subsystem shown in FIG. 6 using the Multicasting Operation Descriptor described in conjunction with FIG. 7.

FIG. 8 is a flowgraph illustrating a RAID-5/6 streaming mirror write operation performed in the storage subsystem 510 shown in FIG. 6 using the Multicasting Operation Descriptor described in conjunction with FIG. 7.

At block 800, the host I/O controller 604 writes data to be written to a storage device to an application data memory region in the memory 602. Processing continues with block 802.

At block 802, a DMA with Multicasting operation descriptor 700 is created and stored in memory. The source address field in the multicasting operation descriptor stores a pointer to the application data memory region in the memory that stores the data to be written to the storage device. A first destination address field 708 in the multicasting operation descriptor 700 stores a pointer to a local processing region in the memory. A second destination address field 708 in the multicasting DMA descriptor stores a pointer to the PCIe NTB port, also referred to as a "mirroring port".

Figure 9:
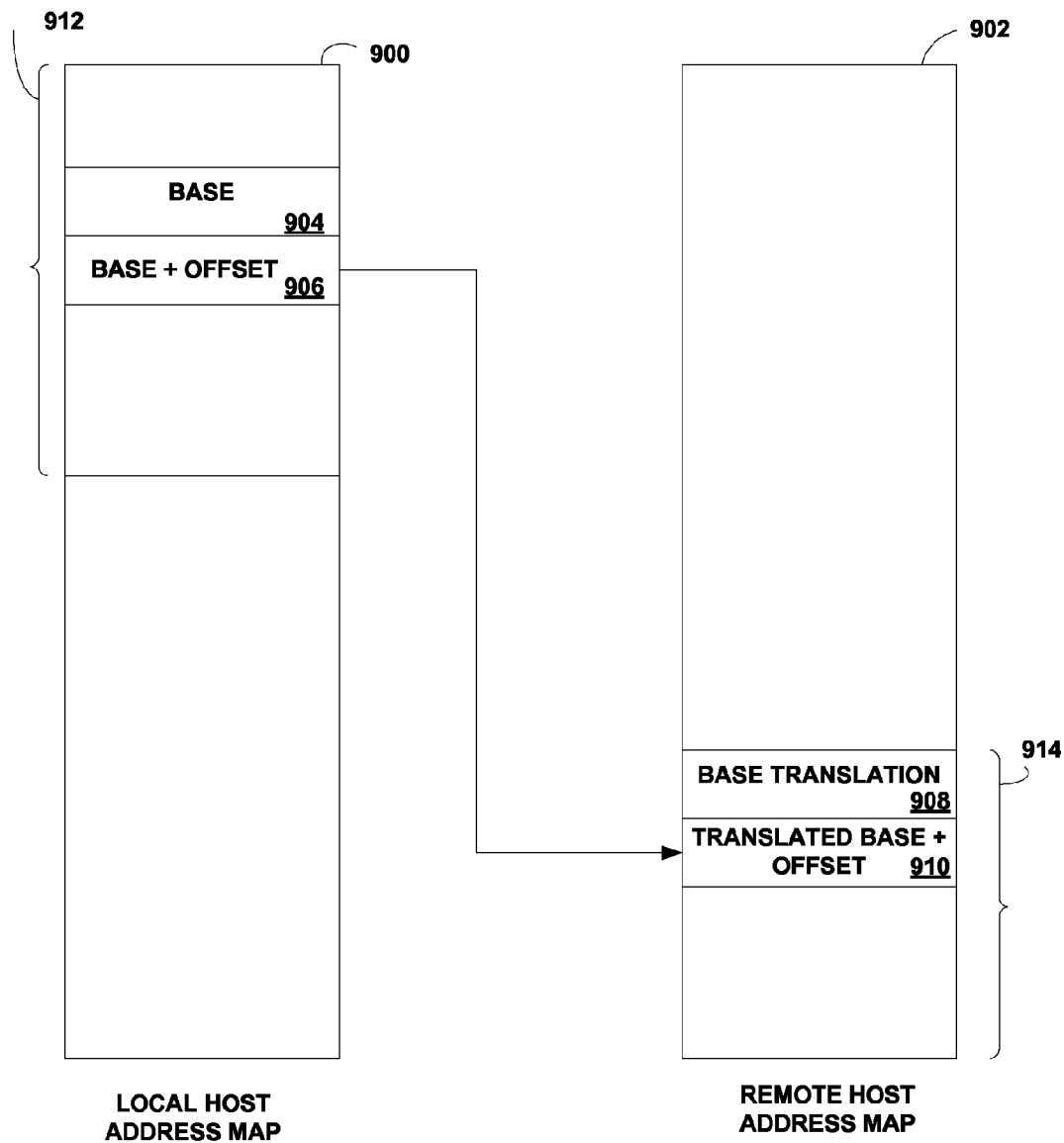
FIG. 9 is a block diagram illustrating direct address translation between the local storage controller and the remote storage controller.

FIG. 9 is a block diagram illustrating direct address translation between the local storage controller and the remote storage controller. Referring to FIG. 9, the local host address map 900 is stored in storage controller 506-1 (FIG. 5) and the remote host address map 902 is stored in storage controller 506-2. The PCIe NTB port includes a PCIe Base Address Register (BAR) and a limit register (PCIe NTB). In an embodiment the BAR register may be a 32 bit or 64 bit register. Through the use of Base Address Registers (BARs) and base translation registers stored in PCI configuration space in memory in the respective storage controllers 506-1, 506-2, memory region 912 in the local storage controller 506-1 is mapped to memory region 914 in the remote storage controller 506-2.

For example, to perform direct address translation from the remote host address map 902 to the local address map 900, a received address (from the remote host) is checked to determine if the received address value is within the address values stored in the BAR register and limit register for the local address map 900. If the received address is valid, the received address is translated into a local address in the local address map. For example, the address stored in the local BAR register in the local address map can be "0000 0040 0000 0000" in hexadecimal notation (H) and the address stored in the remote BAR register in the remote host address map 902 can be '0000 003A 0000 0000H'. The direct address translation is performed on the received address to map it to an address within an address window in the local address map 902 between the address stored in the local BAR register and the local limit register as follows:

Translated Address=((Received Address[63:0] & ~Sign_Extend(2^SBAR23SZ)|XLAT Register[63:0])).

For example, to translate an incoming address claimed by a 4 GB window based at '0000 003A 0000 0000H' to a 4 GB window based at '0000 0040 0000 0000H' where the received address[63:0]='0000 003A 00A0 0000H'; SBAR23SZ=32—Sets the size of Secondary BAR ⅔=4 GB;   ~Sign_Extend(2^SBAR23SZ)=~Sign_Extend(0000 0001 0000 0000H)=~(FFFF FFFF 0000 0000H)=00000000 FFFF FFFFH); SBAR2XLAT=0000 0040 0000 0000H— Base address into the primary side memory (size multiple aligned);

Translated Address =

0000 003A 00A0 0000H & 0000 0000 FFFF FFFFH |

0000 0040 0000 0000H = 0000 004000A0 0000H

The offset to the base of the 4 GB window on the received address is preserved in the translated address.

The DMA engine with two destination addresses and PCIe BAR and limit registers (PCIe NTB) ensures that data is routed to the system memory and higher availability port. The PCIe BAR and limit register (PCIe NTB) are used to translate the address of the memory region of the redundant storage controller that has been reserved for mirroring data. In the embodiment shown in FIG. 6, the PCIe Non-Transparent Bridge (NTB) provides system memory isolation between the two storage nodes. The PCIe NTB acts as a gateway for system memory data exchange between two storage nodes. Each storage node independently configures and controls its respective local memory. The PCIe NTB (Base Address Register (BAR) and translate register) control the memory region for data exchange between the storage nodes. In an embodiment, an NTB doorbell mechanism is used for messaging between the primary storage controller and the redundant storage controller.

Returning to FIG. 8, processing continues with block 804.

At block 804, the DMA controller performs the DMA operations defined by the DMA Multicast descriptor. The DMA controller reads data from memory and sends the data to multiple destinations, that is, system memory and the mirroring port (PCIe NTB port) at the same time. The data is moved from the application memory region in the memory in the active storage controller to the local processing region in the memory in the active storage controller to process the data. The data stored in the data application memory region is moved to the local processing region in the memory while the data stored in the data application region is concurrently forwarded to the PCIe NTB port. Each storage controller configures a respective local memory region for local processing and a remote memory region for the remote controller. For example, in an embodiment, a local processing memory region in a storage controller uses a lower memory region (based on memory addresses) and the upper memory region (based on memory addresses) is configured for use by the remote controller.

The concurrent transfer of the data to multiple destinations eliminates one memory read operation to perform a separate transfer of the data to the PCIe NTB port which also saves memory bandwidth. Processing continues with block 806.

At block 806, the processor in the primary (active) storage controller performs RAID 5/6 parity computation on the data stored in the local processing region and writes the computed RAID 5/6 parity data back to the local processing region while the processor in the redundant storage controller performs the same operations in the data forwarded via the PCIe NTB port. Processing continues with block 808.

At block 808, the redundant storage controller writes the data to system memory (mirror write). Processing continues with block 810.

At block 810, the primary storage controller reads the data and RAID 5/6 parity data from memory and writes to the storage device(s). Software executed in the primary storage controller handles an interrupt related to end of transfer and coalescing the interrupts for IOPS. The large transfer size, interrupts coalescing optimizes the performance for IOPS usage and minimizes processor cache pollution. The DMA descriptor with single read and dual destinations eliminates one memory read operation from system memory to the PCIe NTB port (mirror port) which is typically performed by the DMA controller in the primary storage controller. In one embodiment, the elimination of the additional memory read operation for dual-active RAID-6 streaming write results in an increase in the performance of RAID-6 in a system in which the memory bus frequency is unchanged. In another embodiment, the same performance is provided by reducing the memory bus frequency resulting in a reduction is dynamic power used by the system.

In an embodiment, the mirroring between storage controllers discussed in conjunction with FIGS. 5-7 is used in an external storage platform to offer higher RAID-5/6 streaming mirror write performance with storage acceleration technology.

The multicast DMA descriptor that includes a single source and multiple destinations is used to concurrently move the data from application system memory region to both the local system memory region for RAID-5/6 & data integrity checking and to the PCIe NTB port for mirroring the data in a redundant storage controller. The use of the multicast DMA descriptor to concurrently write to two destinations reduces the total number of memory read operations required by one memory read operation. The use of the multicast DMA descriptor by the PCIe, NTB and DMA drivers integrated into the application stack that handle error conditions provides better control to error handling.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
a non-volatile memory organized as block storage;
a serial system bus interface; and
logic coupled to the non-volatile memory, the logic to provide concurrent redundant paths to the non-volatile memory to one of at least two storage controllers coupled via a serial system bus to the logic, each of the storage controllers in a different host computer system, the storage controllers and logic to communicate via the serial system bus coupled to the serial system bus interface using a non-storage bus protocol, the serial system bus to use a Peripheral Component Interconnect Express (PCIe) bus protocol, the logic including two upstream PCI-to-PCI bridges and a downstream PCI-to-PCI bridge, the logic to allow each of the storage controllers to discover the non-volatile memory accessible via a downstream port of the downstream PCI-to-PCI bridge.

2. The apparatus of claim 1, wherein the logic is included in a first Printed Circuit Board (PCB) and the non-volatile memory is included in a second PCB, the first PCB includes a first connector to couple to the second PCB and the first PCB includes at least two second connectors, each second connector to couple to one of the storage controllers.

3. The apparatus of claim 1, wherein the logic and non-volatile memory are in a solid state drive (SSD) and the logic includes at least two connectors, each connector to couple to one of the one of the storage controllers.

4. The apparatus of claim 1, wherein the logic includes a Multi Root-Input Output Virtualization (MR-IOV) logic to switch access to the non-volatile memory from a first storage controller to a second storage controller upon detecting a failure in the first storage controller.

5. The apparatus of claim 1, wherein the storage controllers to communicate via a PCIe Non-Transparent Bridge (NTB) link.

6. The apparatus of claim 5, wherein each of the storage controllers includes a Direct Memory Access Controller (DMAC), the DMAC to concurrently move data to a memory in a first storage controller and to send the data via the PCIe NTB link to a second storage controller for mirroring in memory in the second storage controller.

7. The apparatus of claim 1, wherein the logic provides exclusive access to half of the non-volatile memory to each of the storage controllers during normal operation.

8. A method comprising:
organizing a non-volatile memory as block storage;
providing, by logic coupled to the non-volatile memory, concurrent redundant paths to the non-volatile memory to one of at least two storage controllers coupled via a serial system bus to the logic, each of the storage controllers in a different host computer system; and
communicating, by the storage controllers via the serial system bus using a non-storage bus protocol, the serial system bus to use a Peripheral Component Interconnect Express (PCIe) bus protocol, the logic including two upstream PCI-to-PCI bridges and a downstream PCI-to-PCI bridge, the logic to allow each of the storage controllers to discover the non-volatile memory accessible via a downstream port of the downstream PCI-to-PCI bridge.

9. The method of claim 8, wherein the logic is included in a first Printed Circuit Board (PCB) and the non-volatile memory is included in a second PCB, the first PCB includes a first connector to couple to the second PCB and the first PCB includes at least two second connectors, each second connector to couple to one of the storage controllers.

10. The method of claim 8, wherein the logic and non-volatile memory are in a solid state drive (SSD) and the logic includes at least two connectors, each connector to couple to one of the one of the storage controllers.

11. The method of claim 8, wherein the logic includes a Multi Root-Input Output Virtualization (MR-IOV) logic to switch access to the non-volatile memory from a first storage controller to a second storage controller upon detecting a failure in the first storage controller.

12. The method of claim 8, wherein the storage controllers to communicate via a PCIe Non-Transparent Bridge (NTB) link.

13. The method of claim 12, wherein each of the storage controllers includes a Direct Memory Access Controller (DMAC), the DMAC to concurrently move data to a memory in a first storage controller and to send the data via the PCIe NTB link to a second storage controller for mirroring in memory in the second storage controller.

14. An article including a non-transitory computer readable storage medium having associated information, wherein the information, when accessed by a processor, results in a machine performing:
organizing a non-volatile memory as block storage;
providing by logic coupled to the non-volatile memory, concurrent redundant paths to the non-volatile memory to one of at least two storage controllers coupled via a serial system bus to the logic, each of the storage controllers in a different host computer system; and
communicating, by the storage controllers via the serial system bus using a non-storage bus protocol, the serial system bus to use a Peripheral Component Interconnect Express (PCIe) bus protocol, the logic including two upstream PCI-to-PCI bridges and a downstream PCI-to-PCI bridge, the logic to allow each of the storage controllers to discover the non-volatile memory accessible via a downstream port of the downstream PCI-to-PCI bridge.

15. The method of claim 8, wherein the storage controllers to communicate via a PCIe Non-Transparent Bridge (NIB) link.

16. The method of claim 12, wherein each of the storage controllers includes a Direct Memory Access Controller (DMAC), the DMAC to concurrently move data to a memory in a first storage controller and to send the data via the PCIe NTB link to a second storage controller for mirroring in memory in the second storage controller.

17. A system comprising:
at least two storage controllers;
a non-volatile memory organized as block storage; and
logic coupled to the non-volatile memory, the logic to provide concurrent redundant paths to the non-volatile memory to one of at the at least two storage controllers coupled via a serial system bus to the logic, each of the storage controllers in a different host computer system, the storage controllers and logic to communicate via the serial system bus using a non-storage bus protocol, the serial system bus to use a Peripheral Component Interconnect Express (PCIe) bus protocol, the logic including two upstream PCI-to-PCI bridges and a downstream PCI-to-PCI bridge, the logic to allow each of the storage controllers to discover the non-volatile memory accessible via a downstream port of the downstream PCI-to-PCI bridge.

18. The system of claim 17, wherein the storage controllers to communicate via a PCIe Non-Transparent Bridge (NTB) link, each of the storage controllers includes a Direct Memory Access Controller (DMAC), the DMAC to concurrently move data to a memory in a first storage controller and to send the data via the PCIe NTB link to a second storage controller for mirroring in memory in the second storage controller.

* * * * *